United States Patent
Sodagar

(10) Patent No.: US 11,212,597 B2
(45) Date of Patent: Dec. 28, 2021

(54) EARLY TERMINATION OF CONTENT

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/872,116

(22) Filed: May 11, 2020

(65) Prior Publication Data

US 2020/0366971 A1 Nov. 19, 2020

Related U.S. Application Data

(60) Provisional application No. 62/848,551, filed on May 15, 2019.

(51) Int. Cl.
*H04N 21/845* (2011.01)
*H04L 29/06* (2006.01)
(Continued)

(52) U.S. Cl.
CPC ..... *H04N 21/8456* (2013.01); *H04L 65/4084* (2013.01); *H04L 65/608* (2013.01);
(Continued)

(58) Field of Classification Search
CPC ............... H04N 21/8456; H04N 21/84; H04N 21/23424; H04N 21/44016; H04N 21/47217; H04N 21/26258; H04N 21/812; H04N 21/23439; H04L 65/605; H04L 65/1089; H04L 65/80; H04L 65/4084;
(Continued)

(56) References Cited

U.S. PATENT DOCUMENTS 10,771,842 B2 * 9/2020 Cava ................. H04N 21/26258
2019/0394537 A1 * 12/2019 Chen ................. H04N 21/8586
2020/0275148 A1 * 8/2020 Stockhammer .. H04N 21/26241

OTHER PUBLICATIONS

International Standard ISO/IEC 23009-1, "Information technology—Dynamic adaptive streaming over HTTP (DASH)—Part 1: Media presentation description and segment formats", $3^{rd}$ Edition, Sep. 25, 2018 (222 pages).

* cited by examiner

*Primary Examiner* — Tonia L Dollinger
*Assistant Examiner* — Joseph M Cousins
(74) *Attorney, Agent, or Firm* — Oblon, McClelland, Maier & Neustadt, L.L.P.

(57) ABSTRACT

Aspects of the disclosure provide methods, apparatuses, and non-transitory computer-readable storage mediums for early termination of content. An information processing apparatus including circuitry is provided. A manifest file for a content stream is received from a first server and primary content is received from the first server based on the manifest file. Manifest file update information is received from the first server. The manifest file update information indicates early termination of secondary content of the content stream during a period is permitted. A request for the secondary content associated with the period is sent to a second server based on the manifest file update information. The secondary content is received from the second server. Further, the secondary content is output for display during the period based on whether the secondary content is terminated early.

16 Claims, 12 Drawing Sheets

(51) Int. Cl.
    *H04N 21/84*          (2011.01)
    *H04N 21/234*        (2011.01)
    *H04N 21/262*        (2011.01)
    *H04N 21/81*          (2011.01)
    *H04N 21/44*          (2011.01)
    *H04N 21/2343*       (2011.01)

(52) U.S. Cl.
    CPC ....... *H04L 65/80* (2013.01); *H04N 21/23424* (2013.01); *H04N 21/23439* (2013.01); *H04N 21/26258* (2013.01); *H04N 21/84* (2013.01); *H04N 21/44016* (2013.01); *H04N 21/812* (2013.01)

(58) Field of Classification Search
    CPC .............. H04L 65/608; G06Q 30/0277; G06Q 30/0272
    See application file for complete search history.

MEDIA PRESENTATION DESCRIPTION (MPD) 300

- Initial early termination information

PERIOD 310A

[PRIMARY CONTENT]

PERIOD 310B

[SECONDARY CONTENT]

- Early termination acquisition information
- Additional timing information
- Early termination update information

PERIOD 310C

[PRIMARY CONTENT]

*FIG. 3*

| Behavior | Numerical value |
|---|---|
| Gap in playback during the transition is acceptable | 1 |
| Loss of quality during the transition is acceptable | 2 |
| Overlap decoding and seamless switching is required/preferred | 3 |

*FIG. 5*

| Element or Attribute Name | Use | Description |
|---|---|---|
| EarlyTermination | | specifies the information about early terminating periods |
| @clientBehavior | O<br>Default: 1 | The value indicates the available methods of Table 2. |
| @required | O<br>Default: false | A Boolean flag indicating if the client behavior is required or preferred. For required, the value shall be 'true'. |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

*FIG. 6*

| Update mechanism | Numerical value |
|---|---|
| MPD pulling | 1 |
| Inband event: streams containing MPD update events are defined in MPD on default period | 2 |
| SAND: Using out-of-band SAND signaling for MPD expiration. | 4 |

*FIG. 7*

```
<Period xlink:href="remote.period" xlink:actuate="onLoad"> xmlns:xlink="http://www.w3.org/1999/xlink">
    <SupplementalProperty schemeIdUri="urn:mpeg:dash:urlparam:2016" xmlns:up="urn:mpeg:dash:schema:urlparam:2016">
        <up:UrlQueryInfo queryString="earlytermination=1&sad=5&gad=30"/>
        <up:ExtUrlInfo includeInRequests="2"/>
    </SupplementalProperty>
    ::  ::  ::
</Period>
```

*FIG. 8*

EARLY TERMINATION OF CONTENT

CROSS-REFERENCE TO RELATED PATENT APPLICATION

This application claims the benefit of priority to U.S. Provisional Application No. 62/848,551, "EARLY AD TERMINATION SIGNALING FOR LIVE MEDIA STREAMING" filed on May 15, 2019, which is incorporated by reference herein in its entirety.

TECHNICAL FIELD

The present disclosure describes embodiments related to early termination of content.

BACKGROUND

The background description provided herein is for the purpose of generally presenting the context of the disclosure. Work of the presently named inventors, to the extend the work is described in this background section, as well as aspects of the description that may not otherwise qualify as prior art at the time of filing, are neither expressly or impliedly admitted as prior art against the present disclosure.

During streaming of content, there can be certain periods (or moments) in which advertisements can be inserted. However, when a period in which the advertisement can be inserted is predetermined, duration of the advertisement needs to match the predetermined period.

SUMMARY

Aspects of the disclosure provide methods, apparatuses, and non-transitory computer-readable storage mediums for early termination of content.

In an embodiment, a method for processing a content stream is provided. A manifest file for a content stream is received from a first server and primary content is received from the first server based on the manifest file. Manifest file update information is received from the first server. The manifest file update information indicates early termination of secondary content of the content stream during a period is permitted. A request for the secondary content associated with the period is sent to a second server based on the manifest file update information. The secondary content is received from the second server. Further, the secondary content is output for display during the period based on whether the secondary content is terminated early.

In an embodiment, the manifest file is a media presentation description (MPD).

In an embodiment, the secondary content is presented between segments of the primary content.

In an embodiment, the secondary content includes advertisement content.

In an embodiment, the manifest file update information includes one or a combination of minimum advanced notice timing information and minimum content duration information. The request for the secondary content includes the one or the combination of the minimum advanced notice timing information and minimum content duration information. Further, the secondary content is selected based on the one or the combination of the minimum advanced notice timing information and the minimum content duration information.

In an embodiment, the manifest file includes early termination capability information that indicates a switching type in response to switching from the secondary content that is terminated early to the primary content.

In an embodiment, the switching type is a gap in playback during the switching, loss of quality during the switching, or seamless switching.

In an embodiment, the manifest file update information includes update mechanism information, the update mechanism information indicating at least one update mechanism for the manifest file.

In an embodiment, the manifest file is a media presentation description (MPD). The update mechanism information is indicated by a value of an event element of the MPD that is included in the period associated with the secondary content for which early termination is permitted.

In an embodiment, a method for providing secondary content is provided. A request for the secondary content is received from an information processing apparatus. The request includes early termination acquisition information that indicates early termination of the secondary content is permitted. The secondary content is selected from a plurality of secondary content based on the early termination acquisition information. The selected secondary content is sent to the information processing apparatus.

In an embodiment, the request includes one or a combination of minimum advanced notice timing information and minimum content duration information. Further, the secondary content is selected based on the early termination acquisition information and the one or the combination of the minimum advanced notice timing information and the minimum content duration information.

In an embodiment, a method for providing a content stream is provided. A manifest file for a content stream is sent to an information processing apparatus. Primary content of the content stream is sent to the information processing apparatus. Manifest file update information is generated. The manifest file update information indicates early termination of secondary content of the content stream during a period is permitted. The generated manifest file update information is sent to the information processing apparatus.

Aspects of the disclosure also provide apparatuses configured to perform any one or a combination of the methods for early termination of content.

Aspects of the disclosure also provide a non-transitory computer-readable storage medium storing instructions which when executed by a computer for video decoding cause the computer to perform any one or a combination of the methods for early termination of content.

BRIEF DESCRIPTION OF THE DRAWINGS

Further features, the nature, and various advantages of the disclosed subject matter will be more apparent from the following detailed description and the accompanying drawings in which:

FIG. 3 illustrates a manifest file structure according to an embodiment of the present disclosure;

FIG. 5 illustrates exemplary switching behaviors according to an embodiment of the present disclosure;

FIG. 6 illustrates early termination capability information according to an embodiment of the present disclosure;

FIG. 7 illustrates exemplary update mechanisms according to an embodiment of the present disclosure;

FIG. 8 illustrates early termination acquisition information according to an embodiment of the present disclosure;

DETAILED DESCRIPTION OF EMBODIMENTS

Figure 1:
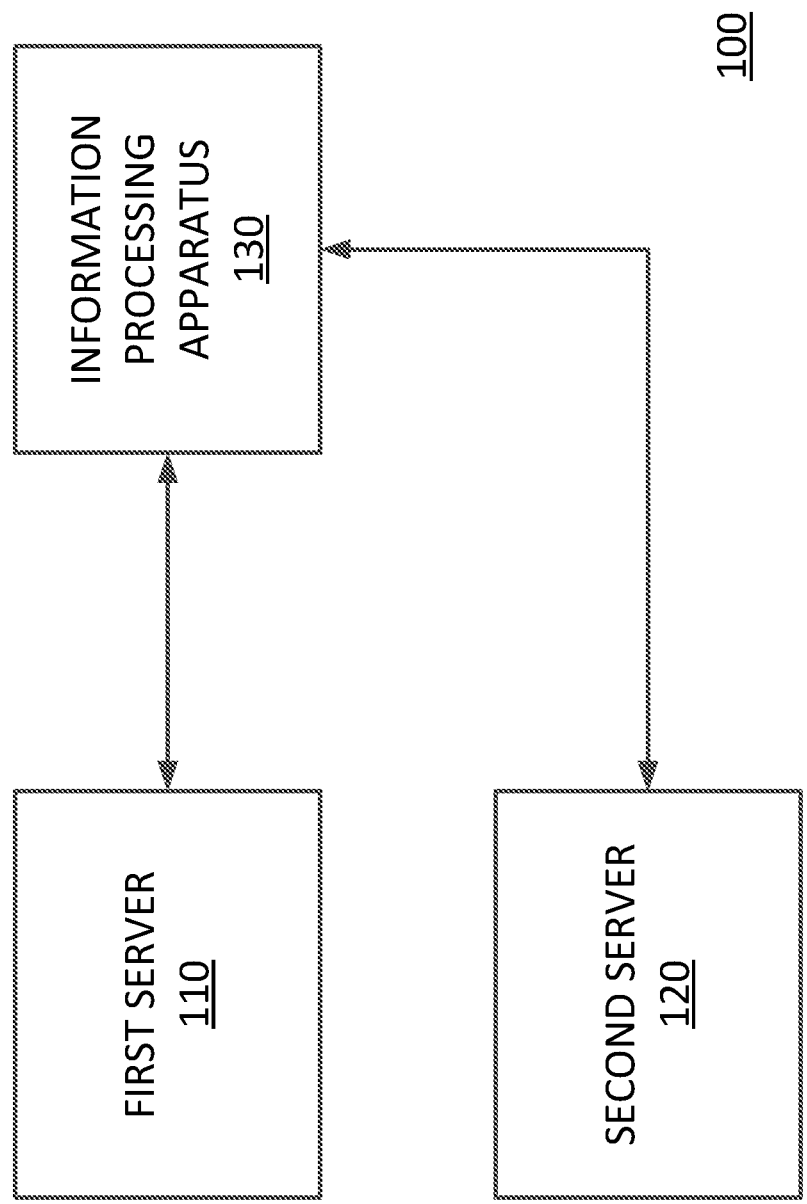
FIG. 1 illustrates a system according to an embodiment of the present disclosure.

For a more complete understanding of this disclosure, reference is now made to the following brief description, taken in connection with the accompanying drawings and detailed description, wherein like reference numerals represent like parts.

The present disclosure includes embodiments directed to early determination of content, for example in a streaming service. The streaming service can include a content stream of live or on-demand (pre-recorded) content. The content stream can include primary content and secondary content. The secondary content can be inserted and displayed between segments of the primary content. The secondary content can be terminated early when desired, and include any content that is different from the primary content. For example, the secondary content can include an advertisement, commentary, statistics information (e.g., sports statistics), and/or any other content intended to be displayed during breaks in the primary content.

The primary content can correspond to a main program (e.g., live content) and the secondary content can correspond to advertisement content (e.g., pre-recorded advertisement content). For example, during a live streaming of content, there can be certain periods (or moments) that the secondary content can be inserted (e.g., advertisement breaks). The nominal duration of the secondary content can be determined by a primary content server (e.g., main program server) and inserted into a manifest file. During one of those periods, a client can communicate with a secondary content server (e.g., advertisement server) to stream and/or playback secondary content. The secondary content server sends the secondary content to the client with a duration that matches the exact duration that is indicated in the original manifest file. For example, the duration of a secondary content break can be fixed by the primary content server prior to insertion of the secondary content and the client can switch from the secondary back to the main program at the known fixed time. However, early termination of the secondary content in this case can be difficult to achieve, or not achievable, and the quality of playback cannot be predicted in many cases.

In some cases, during the streaming or playback of the secondary content (e.g., advertisement content), the primary content server may want to the client to stop streaming the secondary content and switch back to the primary content (e.g., main program) sooner than initially planned. Such cases can be referred to as the early termination of secondary content. The present disclosure includes embodiments that enable a content server to signal that a period may be terminated early and that a manifest file may have one or more early termination periods. Further, the present disclosure includes embodiments in which one or more expected behaviors during the early termination of the secondary content is indicated. Therefore, a client can decide if it is capable of supporting early termination functionality during playback and provide the expected behavior or warn against it. Further, information can be communicated to a secondary content server through the client to allow better fitted secondary content to be provided for early termination periods.

FIG. 1 illustrates a system (100) according to an embodiment of the present disclosure. The system (100) includes a first server (110), a second server (120), and an information processing apparatus (130). Early termination of content such as advertisements in Internet media streaming can be provided. The first server (110) can provide primary content (e.g., a main program) and signal the possibility of shortening secondary content (e.g., advertisement content) from an intended duration. For example the first server (110) can include a primary content server. The first server (110) enables characteristics of the secondary content to be signaled to second server (120) and the information processing apparatus (130). Thus, a streaming session can be improved by allowing for the early termination of secondary content. The functions of the first server (110) can be distributed among a plurality of servers in some embodiments. For example, manifest information (e.g., manifest files and/or manifest updates) can be provided by one or more servers and the primary content can be provided by one or more other servers.

The second server (120) can provide the secondary content to the information processing apparatus (130). For example, the second server (120) can include an advertisement server. The second server (120) can select the secondary content to provide to the information processing apparatus (130) based on whether there is a possibility that the secondary content can be terminated early. Further, the second server (120) can select the secondary content based on additional information (e.g., timing information). For example, the second server (120) can select secondary content with a duration that is based on the additional information.

The information processing apparatus (130) can interface with the first server (110) and the second server (120). For example, the information processing apparatus (130) can playback content received from the first server (110) and the second server (120). The playback of the content can be performed based on a manifest file received by the information processing apparatus (130) (e.g., from the first server (110)).

Figure 2:
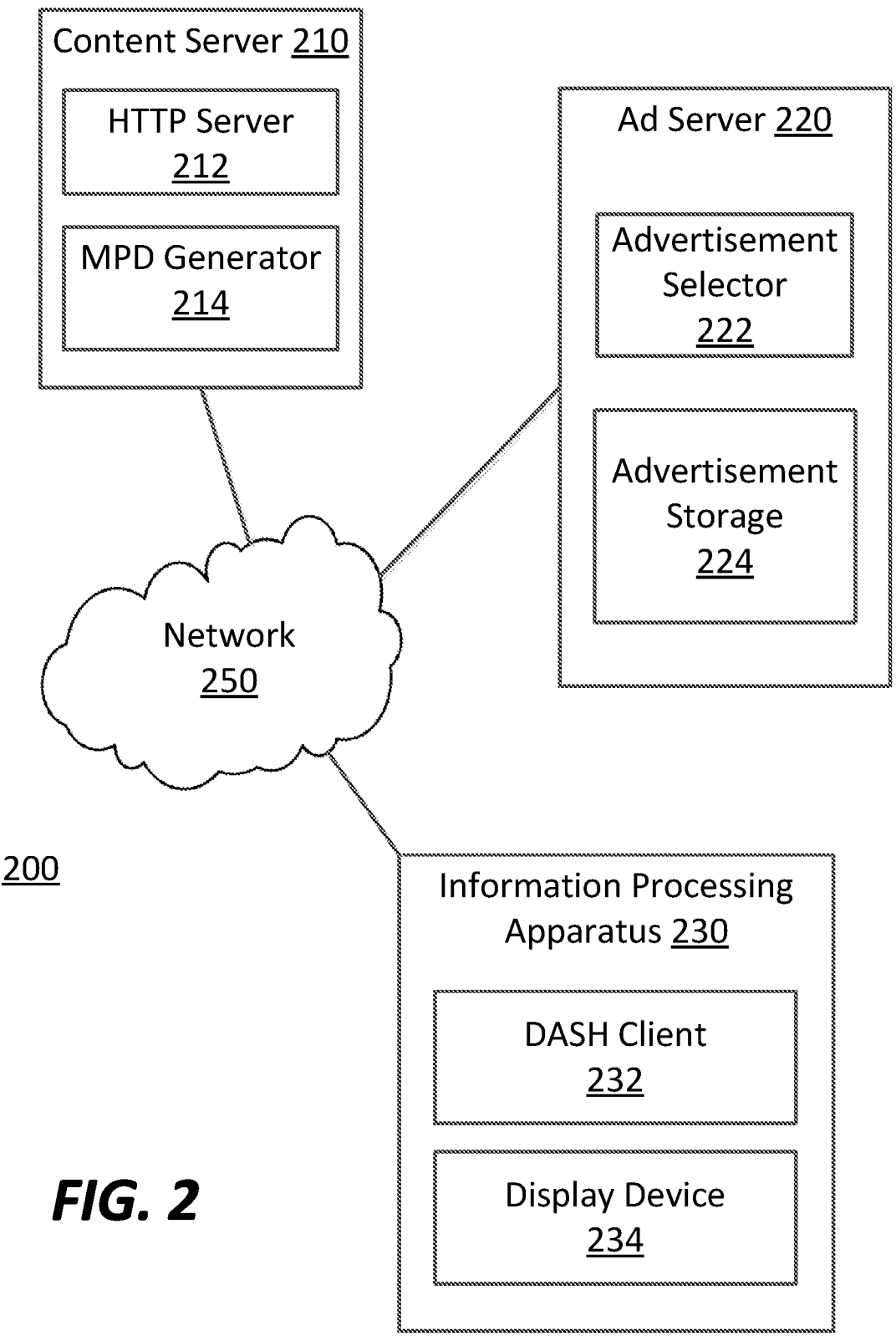
FIG. 2 illustrates a Dynamic Adaptive Streaming over HTTP (DASH) system according to an embodiment of the present disclosure.

An exemplary Dynamic Adaptive Streaming over HTTP (DASH) (or MPEG-DASH) system (200) is illustrated in FIG. 2. The DASH system (200) can include a content server (210), an advertisement server (220), and an information processing apparats (230) which are connected to a network (250). In some embodiments, the content server (210) cannot communicate directly with the advertisement server (220), and provides early termination information to the advertisement server (220) via the information processing apparatus (230).

The content server (210) can provide primary content (e.g., a main program) and a manifest file, such as a media presentation description (MPD), to the information processing apparatus (230). The manifest file can be generated by the MPD generator (214) for example. The primary content and the manifest file can be provided by different servers in other embodiments.

The information processing apparatus (230) receives the MPD and can acquire primary content from an HTTP server (212) of the content server (210) based on the MPD. The MPD can be processed by a DASH client (232) executed on the information processing apparatus (230). Further, the DASH client (232) can acquire advertisement content from the advertisement server (220). The main content and the advertisement content can be processed by the DASH client (232) and output for display on a display device (234). The display device (234) can be integrated in, or external to, the information processing apparatus (230).

The advertisement server (220) can store advertisement content in advertisement storage (224), such as a memory. The advertisement server (220) can include an advertisement selector (222), which is executed on the advertisement server (220) for example and configured to select advertisement content based on whether the early termination of the advertisement content is possible, or permitted. The selection can also be based on additional information (e.g., timing information).

FIG. 3 illustrates an exemplary manifest file. The manifest file is an MPD (300) according to an embodiment. The MPD (300) describes a DASH media presentation and can be in the form of an Extensible Markup Language (XML) document. The manifest file could correspond to other streaming formats such as HTTP Live Streaming (HLS) for example. The MPD (300) can include a sequence of one or more periods (e.g., periods (310A-310C)). Each period can include one or more adaptation sets. Each adaptation set can include one or more representations. Further, each representation can include one or more segments. The MPD (300) can define formats to announce HTTP uniform resource locators (URLs), or network addresses, for downloading the segments of data.

A period can be defined by a period element in an MPD element. The period can provide an opportunity for secondary content insertion. In certain circumstances, the MPD is offered such that a next period is a continuation of content in a previous period, possibly the immediately following period or in a later period (e.g., after an advertisement period has been inserted).

An adaptation set can be described by an adaptation set element. Adaptation set elements can be contained in a period element. The adaptation set can include alternate representations (i.e., only one representation within an adaptation set is expected to be presented at a time). All representations contained in one adaptation set can represent the same media content components and therefore contain media streams that are considered to be perceptually equivalent. The adaption set and the contained representations can contain sufficient information such that seamless switching across different representations in one adaptation set is enabled.

Representations can be described by a representation element. Representation elements are contained in an adaptation element, as noted above. The representation can be one of the alternative choices of the complete set or subset of media content components comprising the media content during a defined period. The representation can start at the start of the period (e.g., PeriodStart) and continue until the end of the period (i.e., the start of the next period or the end of the media presentation). Each representation can include one or more media streams, where each media stream is an encoded version of one media content component.

As noted above, each representation can include one or more segments. In an embodiment, the segment can be referenced by an HTTP-URL included in an MPD. The HTTP-URL can be defined as an <absolute-URI> according to IETF RFC 3986, for example, with a fixed scheme of "http" or "https", possibly restricted by a byte range if a range attribute is provided together with the URL. The byte range can be expressed as byte-range-spec as defined in IETF RFC 2616, for example. It can be restricted to a single expression identifying a contiguous range or bytes. In an embodiment, the segment can be included in the MPD with a data URL, for example as defined in IETF RFC 2397.

Each segment referenced through an HTTP-URL in the MPD can be associated with a segment availability interval (e.g., a time window in wall-clock time at which the segment can be accessed via the HTTP-URL). Representations can be assigned segment information through the presence of elements base URL, segment base, segment template, and/or segment list. The segment information can provide information on the location availability and properties of all segments contained in one representation.

In some embodiments of the present disclosure, MPD information for the MPD (300) can include early termination information. The early termination information can include initial early termination information (e.g., indicating the possibility of early termination periods and/or one or more required/preferred capabilities), early termination acquisition information, early termination update information, and/or additional timing information.

Figure 4:
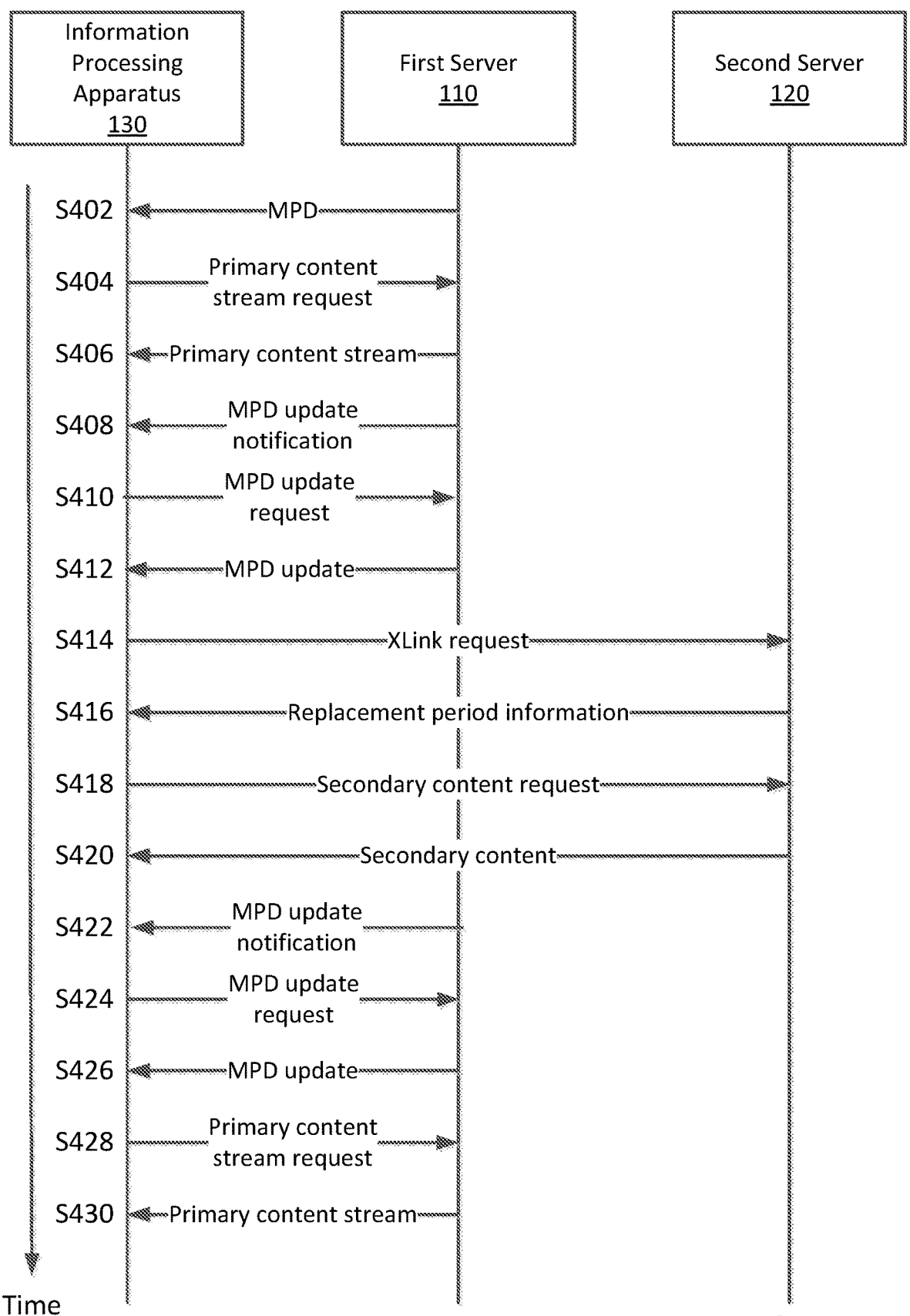
FIG. 4 illustrates a flow diagram according to an embodiment of the present disclosure.

Since a secondary content period (e.g., advertisement period) and its duration can be signaled using a remote period in a manifest, the duration of the signaled remote period can be predefined. FIG. 4 illustrates a general flow diagram that allows shortening the duration of the secondary content period according to some embodiments.

An origin server, such as the first server (110), can first publish an original manifest file (e.g., an MPD). A client, such as the information processing apparatus (130) can receive or acquire the original manifest file, for example at step (S402). The original manifest file can indicate that early termination of periods is possible, or permitted. Further, the original manifest file can indicate one or more capabilities that are required and/or preferred for the information processing apparatus (130) to perform early termination of secondary content. As noted above, the manifest information (e.g., MPD information) and the primary content can be provided by different servers in other embodiments.

After receiving the original manifest file, the information processing apparatus (130) can start streaming the primary content. For example, the information processing apparatus (130) can requests the primary content stream from the first server (110) at step (S404) and receive the primary content stream at step (S406). The primary content stream can be requested based on information (e.g., HTTP-URLs referencing segments of the primary content) included in the original manifest file.

The first server (110) can update the manifest file by inserting a secondary content period (e.g., advertisement period). The manifest file update can include a default period fall back and/or information to be communicated to the second server (120). For example, an MPD update can include an XLink period with a default period fallback and/or the information to be communicated to the second server (120). The MPD update is sent to the information processing apparatus (130).

In one embodiment, at step (S408), the first server (110) can provide a manifest file update notification to the information processing apparatus (130). The MPD update notification can be received according to any one or more update mechanisms. For example, the information processing apparatus (130) can obtain updates using any one or a combination of the following update mechanisms: (i) streaming of a representation of the default period and parsing event boxes (e.g., in-band events in different segments) to receive any MPD expiration event, (ii) pulling of the MPD (e.g., based on a minimum update period) to see if the MPD is updated, and/or (iii) establishing of a Server and Network-assisted DASH (SAND) channel to receive a MPD expiry message if supported. The MPD expiration event can correspond to a MPD validity expiration event that is included in the primary content stream and includes an inband event carrying an MPD expiration message. The minimum update period used for MPD pulling can be indicated by an @minimumUpdatePeriod attribute included in the MPD element.

In response to the MPD update notification, the information processing apparatus (130) can send an MPD update request to the first server (110) at step (S410). At step (S412), the information processing apparatus (130) can receive the manifest file update information. For example, the information processing apparatus (130) receives the MPD update information in response to the MPD update request. The MPD update information can include additional information (e.g., timing information) about the early termination properties of the secondary content period.

In some embodiments, the manifest file update information includes an XLink that is resolved by the information processing apparatus (130). For example, the information processing apparatus (130) can send an XLink request to the second server (120) at step (S414), and receive replacement period information in response to the XLink request at step (S416).

At step (S418), the information processing apparatus (130) can send a request for secondary content to the second server (120) (e.g., advertisement server). For example, the information processing apparatus (130) can generate the request based on an XLink included in MPD or the MPD update information. The request can optionally include information about early termination properties, for example in the XLink query string.

At step (S420), the information processing apparatus (130) can receive the secondary content from the second server (120). For example, the second server (120) streams or otherwise sends the secondary content to the information processing apparatus (130).

Since early termination is possible, the information processing apparatus (130) can receive MPD update information that indicates timing information (e.g., shortened timing information) for the early termination. For example, the information processing apparatus (130) can obtain updates using any one or a combination of the update mechanisms described above, for example (i) parsing of in-band events (e.g., for an MPD expiration event), (ii) pulling of the MPD, and/or (iii) using a SAND channel if supported. The update mechanism used to obtain timing information for the early termination can be determined based on the additional information about the early termination properties received at step (S412) for example.

In response to the MPD update notification, the information processing apparatus (130) can send an MPD update request to the first server (110) at step (S424). At step (S426), the information processing apparatus (130) can receive the manifest file update information. For example, the information processing apparatus (130) receives the MPD update information in response to the MPD update request. The manifest file update information can include the timing information for the early termination of the secondary content period.

The information processing apparatus (130) can end the secondary content period with a new duration when the timing information for the early termination is received. The information processing apparatus (130) can then continue streaming the primary content from the first server (110). For example, the information processing apparatus (130) requests the primary content stream from the first server (110) at step (S428) and receives the primary content stream at step (S430).

Various parameters can be provided for early termination signaling. One or more parameters can be used to signal behavior of the information processing apparatus (130) during a transition (e.g., from secondary content back to primary content). However, segments may not be aligned when the secondary content is terminated early. Possible behaviors during the transition can include inserting a gap in playback during the transition, loss of quality during the transition, and/or overlap decoding and seamless switching.

One or more parameters can be used to signal the update mechanism for updating the MPD updates (e.g., during streaming of the primary content or the secondary content period). One or more exemplary MPD update mechanisms can include the MPD pulling, inband events, and the use of SAND, as described above.

A parameter can be used to signal shortest/minimum advanced notice time information (e.g., the shortest advanced duration to termination point (SAD)). For example, the first server (110) can be restricted to never give notice to the information processing apparatus (130) for early termination later than the SAD duration to the actual point of early termination (e.g., in wall clock time).

Further, a parameter can be used to signal shortest/minimum content duration information such as guaranteed ad duration (GAD). For example, for early termination of secondary content, the first server (110) may be able to guarantee a minimum duration that it would not terminate the secondary content from the secondary content break point.

The possibility that secondary content can be terminated early can be signaled in the manifest file. One or more capabilities that are required or preferred during the termination of the secondary content can also be signaled in the manifest file. For example, an indication that early termination of the secondary content is permitted and/or the one or more required or preferred capabilities can be signaled at a top level of the manifest file. Therefore, the information processing apparatus (130) can determine whether it can support any required capabilities, and if supported, start streaming of the content.

In MPEG DASH, initial early termination information can be provided in an MPD element. In some embodiments, the information can be provided in an essential property or supplemental property descriptor of the MPD element. The essential property descriptor can specify information about the containing element that is considered essential by the media presentation. The supplemental property descriptor can specify supplemental information about the containing element that may be used by the DASH client for optimizing the processing. Required capabilities can be indicated in the essential property descriptor and preferred capabilities can be indicated in the supplemental property descriptor for example. When a capability is preferred, the information processing apparatus (130) can decide to behave differently.

A specific scheme URL (e.g., http://dashiforg/guidelines/earlyterminatingcontent) can be defined for the initial early termination information. A value of the descriptor can indicate the one or more capabilities (e.g., required or preferred) during the early termination switch back. Exemplary values are included in the behavior table illustrated in FIG. 5. For example, a numerical value 1 can indicate that a gap in playback during a transition from the secondary content back to the primary content is acceptable (e.g., a gap caused by looking for a next intra-coded picture frame). A numerical value of 2 can indicate that the loss of quality during the transition is acceptable (e.g., playback could start from a predicted frame before reaching a next intra-coded picture frame). A numerical value of 3 can indicate that overlap decoding and seamless switching is to be performed during the transition (e.g., decode a frame such as an I frame before the switch to the secondary content and a frame after the switch back to the primary content).

In some embodiments, the initial early termination information can be signaled using a new element in the manifest file. In one embodiment, the initial early termination information can be signaled in a new child element in the MPD element level. For example, the initial early termination information can be signaled using an early termination element as illustrated in FIG. 6.

Events can be used to indicate the one or more MPD update mechanisms that the information processing apparatus (130) can use to obtain MPD update information (e.g., early termination acquisition information, additional timing information, and/or early termination update information). The events can be provided in the MPD or within a representation in order to signal aperiodic information to the information processing apparatus (130). Events of the same type can be summarized in an event stream that is specified by an element (e.g., EventStream) in a period element.

Further, event streams can be multiplexed with representations by adding the event messages as part of the segments. The events streams can be present in selected representations, in one or several selected adaptation sets only or in all representations. An inband event stream that is present in a representation can be indicated by an element (e.g., an InbandEventStream element) on the adaptation set or representation level.

In some embodiments, early termination information can be signaled at a period level. A benefit of this approach is that each period can have its own characteristics in terms of an MPD update event mechanism. A specific scheme URI (e.g., http://dashif.org/guidelines/earlyterminatingcontent) can be defined for an event. A value of the event can be used to indicate the possible MPD update mechanism during the period. In an embodiment, the value can be any combination of the numerical values in the table illustrated in FIG. 7. For example, a numerical value of 1 can indicate MPD pulling is used. A numerical value of 2 can indicate that an inband event is used (e.g., an inband event such as an MPD validity expiration event containing an MPD expiration message included in the primary content stream). A numerical value of 4 can indicate the use of SAND (e.g., the use of out-of-band SAND signaling to indicate the expiration of the MPD). One or more of the MPD update mechanisms can be applied at the MPD level, instead of the period level, in other embodiments.

Any combination of values indicating different MPD update mechanisms can be added together to signal the availability of more than one MPD update mechanism. For instance, value 3 can indicate that both MPD pulling and inband events can be used to obtain MPD updates. The message data or body of an event element (e.g., message-Data), or message data of an inband event (e.g., message_data) can include additional information such as minimum content duration information (e.g., GAD) and/or minimum advanced notice timing information (e.g, SAD). The events can be inserted along with MPD validation expiry information (e.g., inband MPD validation expiry events, MPD event for an MPD update). The duration and presentation time, presentation time delta, and/or presentation time offset can be set to identical values of the corresponding MPD update validation expiry event (e.g., the event has identical timing as of the corresponding MPD update event).

The second server (120) (e.g., secondary content or advertisement server) can benefit from receiving early termination acquisition information that indicates whether its content may be terminated early. The early termination acquisition information can be provided with additional information (e.g., timing information). Using the early termination acquisition and/or additional information, the second server (120) could provide secondary content with a shorter duration. For example, the shorter secondary content can include advertisement content that fits within GAD duration and therefore would not be interrupted even if subjected to early termination. The secondary content can include advertisement content with segment duration shorter than SAD. Therefore, the possibility of better switching if the secondary content is terminated early can be provided. The shorter secondary content could be selected based on any combination of the timing information in other embodiments.

In some embodiments, the secondary content can be acquired using an XLink. The XLink can contain query strings that describe parameters corresponding to the early termination acquisition and/or additional information. The first server (110) can require the information processing apparatus (130) to insert the early termination acquisition and/or additional information, using a URLQueryInfo element of the DASH specification for example. An example is illustrated in FIG. 8.

For example, in FIG. 8, "earlytermination=1" can indicate the possibility of early termination. For "sad=N", N can define an amount of time (e.g., N seconds) for the SAD parameter. For "gad=M", M can define an amount of time (e.g., M second) for the GAD parameter. The information processing apparatus (130) receiving such a manifest can add the query string to the remote period XLink request. The second server (120) can parse this query to determine that early termination is possible and one or more associated timing characteristics. The second server (120) can select between different secondary content or versions of a secondary content based on whether early termination is possible and/or the one or more associated time characteristics to provide better suitable content. For example, the second server (120) can provide replacement period information for the information processing apparatus (130) to retrieve the better suitable content.

Figure 9:
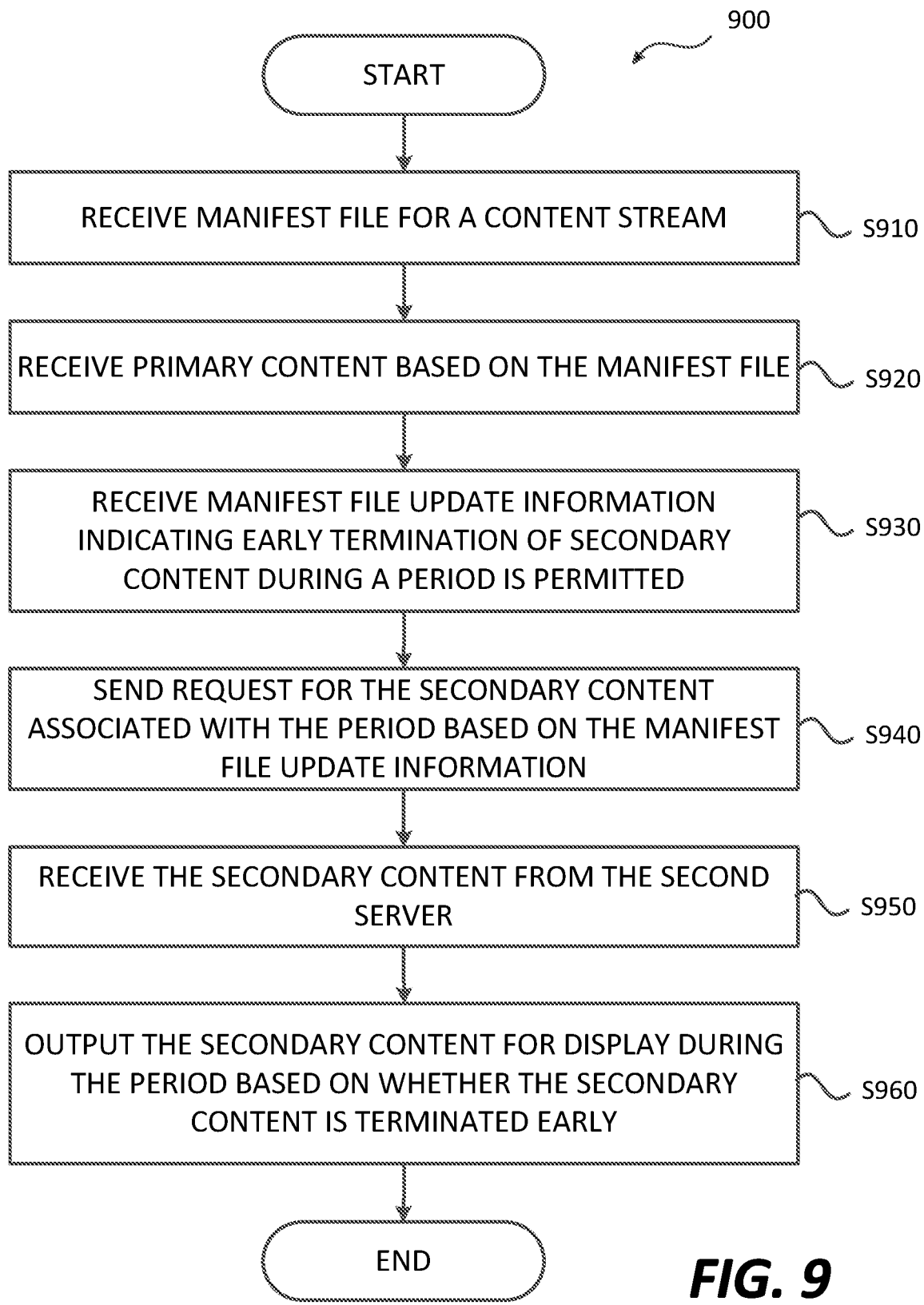
FIG. 9 illustrates an exemplary method of an information processing apparatus according to an embodiment of the present disclosure.

FIG. 9 illustrates an exemplary method (900) that can be performed by the information processing apparatus (130). The method (900) starts at step (S910) at which time a manifest file (e.g., a MPD) for a content stream is received (e.g., from the first server (130)). At step (S920), primary content is received based on the manifest file. At step (S930), manifest file update information is received. The manifest file update information indicates early termination of secondary content during a period is permitted and can include additional information (e.g., timing information). At step (S940), a request for the secondary content associated with the period is sent to the second server (120) based on the manifest file update information. At step (S950), the secondary content is received from the second server (120). At step (S960), the secondary content is output for display during the period based on whether the secondary content is terminated early. The information processing apparatus (130) can determine if the secondary content is terminated early based on early termination update information (e.g., as received at step (S426) in FIG. 4)

One or more of the steps illustrated in FIG. 9 can be performed based on the processes illustrated in FIG. 4 for example. For example, the information processing apparatus (130) receives a manifest file update notification (e.g., step (S408)) and sends a manifest file update request (e.g., step (S410)) to the first server (110) in response to the notification. The information processing apparatus (130) receives the manifest file update information (e.g., step (S412)) in response to the manifest file update request. In an embodiment, the information processing apparatus (130) sends an XLink request (e.g., step (S414)) to the second server (120) and receives replacement period information (e.g., step (S416)). The information processing apparatus (130) can send the request for the secondary content based on the received replacement period information.

Figure 10:
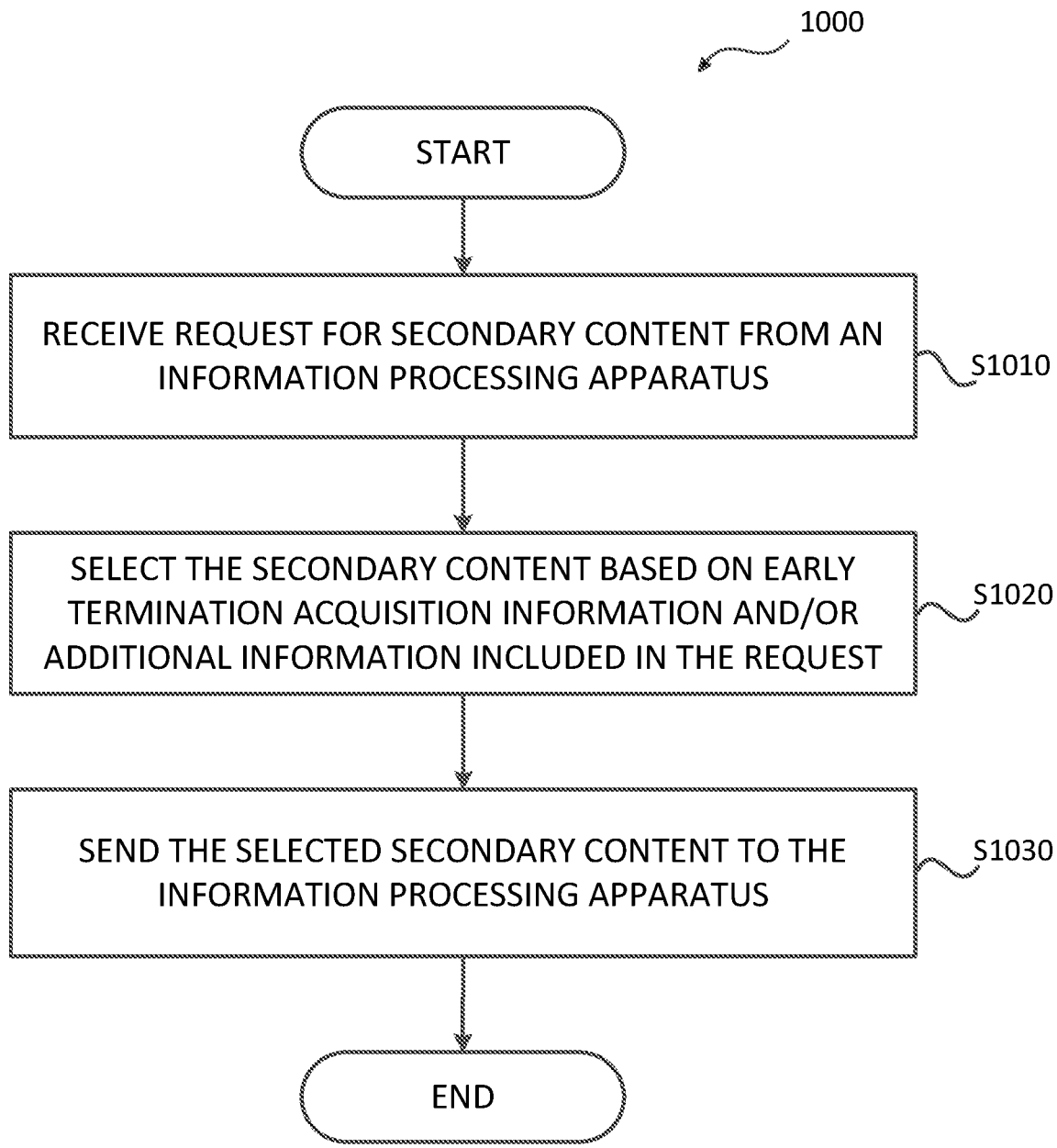
FIG. 10 illustrates an exemplary method of a first server according to an embodiment of the present disclosure.

FIG. 10 illustrates a method (1000) that can be performed by the second server (120) according to an embodiment of the present disclosure. The method (1000) starts at step (S1010) at which time the second server (120) receives a request for secondary content (e.g., one or more segments of the secondary content) from the information processing apparatus (130). At step (S1020), the second server (120) selects the secondary content based on early termination acquisition information and/or additional information when included in the request. For example, early termination acquisition information can indicate whether early termination is possible and the additional information can indicate SAD and/or GAD. At step (S1030), the second server (120) sends the selected secondary content to the information processing apparatus (130).

One or more of the steps illustrated in FIG. 10 can be performed based on the processes illustrated in FIG. 4 for example. For example, the second server (120) can receive an XLink request from the information processing apparatus (130) (e.g., step (S414)). The second server (120) can send replacement period information (e.g., step (S416)) to the information processing apparatus (130) in response to the XLink request. The second server (120) can send the selected secondary content (e.g., step (S420)) in response to a request (e.g., step (S418)) from the information processing apparatus (130) that is made based on the replacement period information.

Figure 11:
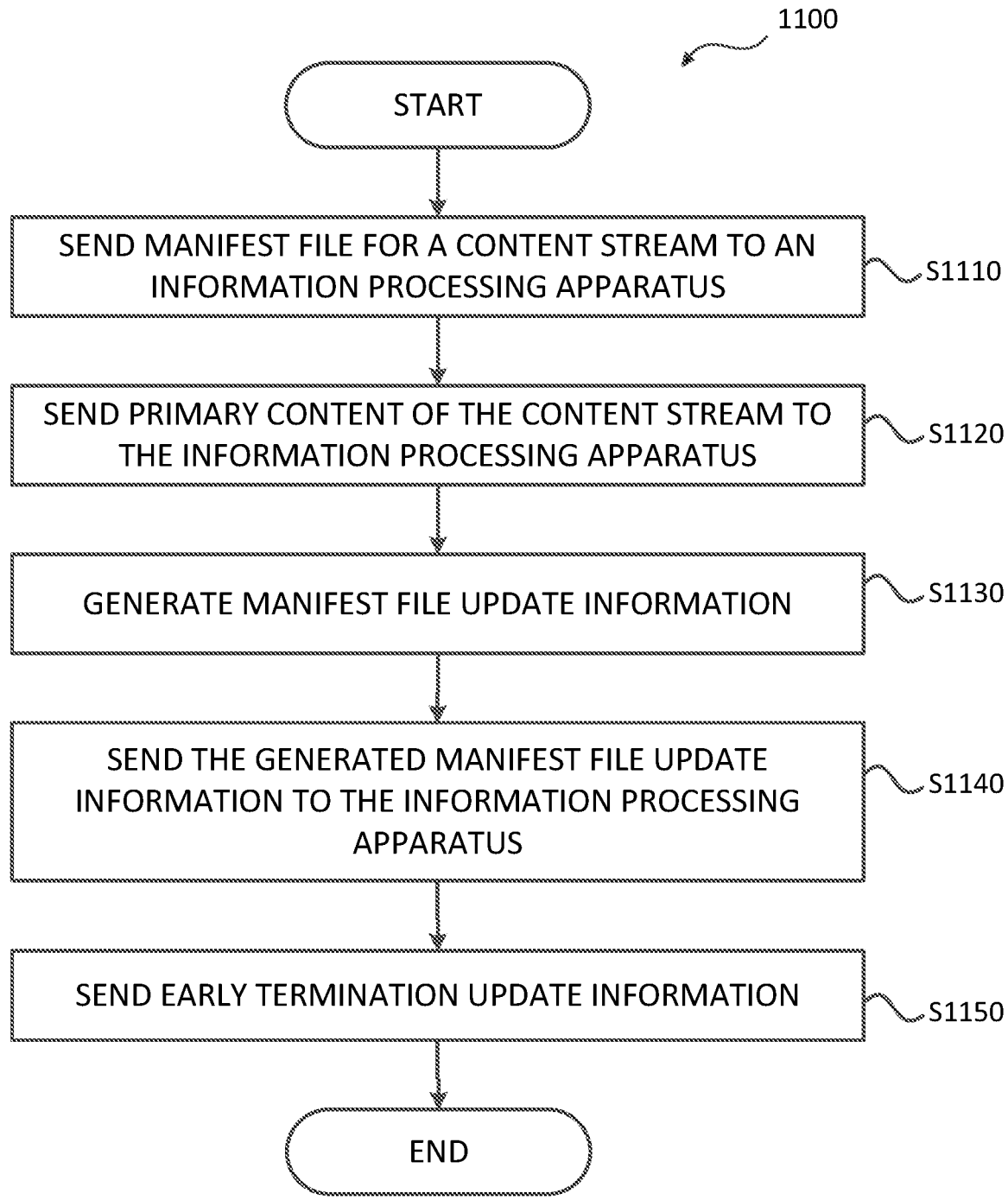
FIG. 11 illustrates an exemplary method of a second server according to an embodiment of the present disclosure.

FIG. 11 illustrates a method (1100) that can be performed by the first server (110) according to an embodiment of the present disclosure. The method (1100) starts at step (S1110) at which time the first server (110) sends a manifest file (e.g., an MPD) for a content stream to the information processing apparatus (130). At step (S1120), the first server (110) sends primary content of the content stream to the information processing apparatus (e.g., in response to content requests from the information processing apparatus (130) based on the manifest file). At step S1130, the first server (110) generates manifest file update information. At step (S1140), the first server (110) sends the generated manifest file update information to the information processing apparatus (130). At step (S1150), the first server (110) can send early termination update information indicating that secondary content is to be terminated early.

One or more of the steps illustrated in FIG. 11 can be performed based on the processes illustrated in FIG. 4 for example. For example, the manifest file update information can correspond to the MPD update of steps (S408, S410, S412) or (S422-S426)).

The proposed methods may be used separately or combined in any order. Further, each of the methods or embodiments, information processing apparatuses, and servers may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 12 shows a computer system (1200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
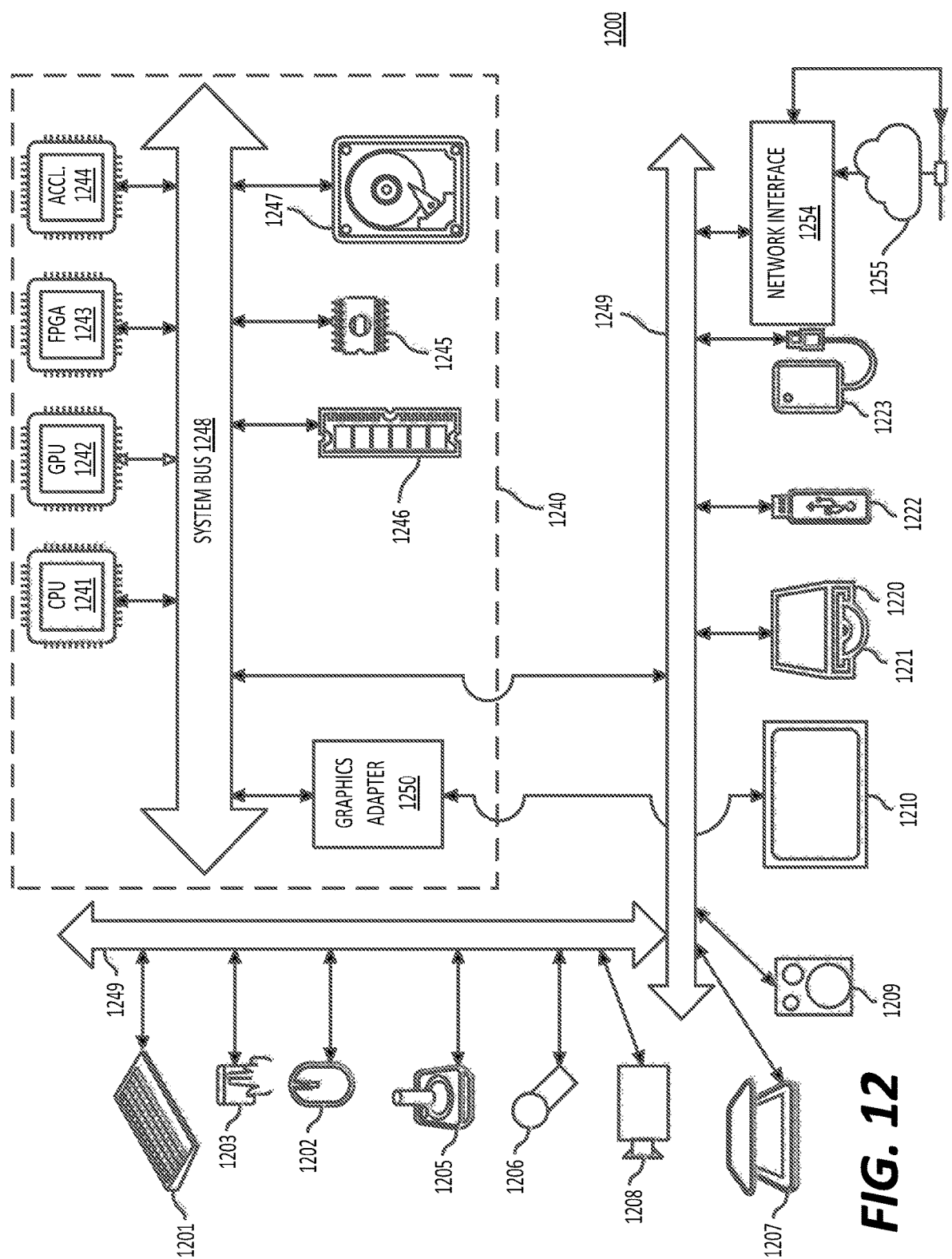
FIG. 12 illustrates a computer system according to some embodiments of the present disclosure.

The components shown in FIG. 12 for the computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of the computer system (1200).

The computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (e.g., scanned images, photographic images obtain from a still image camera), video (e.g., two-dimensional video, three-dimensional video including stereoscopic video).

Input human interface devices may include one or more of (only one of each depicted): keyboard (1201), mouse (1202), trackpad (1203), touch screen (1210), data-glove (not shown), joystick (1205), microphone (1206), scanner (1207), and camera (1208).

Computer system (1200) may also include certain human interface output devices. Such human interface output devices may be stimulating the senses of one or more human users through, for example, tactile output, sound, light, and smell/taste. Such human interface output devices may include tactile output devices (e.g., tactile feedback by the touch-screen (1210), data-glove (not shown), or joystick (1205), but there can also be tactile feedback devices that do not serve as input devices), audio output devices (e.g., speakers (1209), headphones (not depicted)), visual output devices (e.g., screens (1210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

The computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

The computer system (1200) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (e.g., USB ports of the computer system (1200)); others are commonly integrated into the core of the computer system (1200) by attachment to a system bus as described below (for example Ethernet interface into a PC computer system or cellular network interface into a smartphone computer system). Using any of these networks, the computer system (1200) can communicate with other entities. Such communication can be uni-directional, receive only (e.g., broadcast TV), uni-directional send-only (e.g., CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators for certain tasks (1244), and so forth. These devices, along with Read-only memory (ROM) (1245), Random-access memory (1246), internal mass storage such as internal non-user accessible hard drives, SSDs, and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). Architectures for a peripheral bus include PCI, USB, and the like.

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hardwired or otherwise embodied in a circuit (e.g., accelerator (1244)), which can operate in place of or together with software to execute particular processes or particular parts of particular processes described herein. Reference to software can encompass logic, and vice versa, where appropriate. Reference to a computer-readable media can encompass a circuit (e.g., an integrated circuit (IC)) storing software for execution, a circuit embodying logic for execution, or both, where appropriate. The present disclosure encompasses any suitable combination of hardware and software.

What is claimed is:

1. An information processing apparatus comprising:
   circuitry configured to
   receive a manifest file for a content stream,
   receive primary content from a first server based on the manifest file,
   receive manifest file update information from the first server, the manifest file update information indicating early termination of secondary content of the content stream during a period is permitted,
   send a request for the secondary content associated with the period to a second server based on the manifest file update information,
   receive the secondary content from the second server, and
   output the secondary content for display during the period based on whether the secondary content is terminated early,
   wherein the manifest file includes early termination capability information that indicates a switching type in response to switching from the secondary content that is terminated early to the primary content.

2. The information processing apparatus according to claim 1, wherein the manifest file is a media presentation description (MPD).

3. The information processing apparatus according to claim 1, wherein the secondary content is presented between segments of the primary content.

4. The information processing apparatus according to claim 1, wherein the secondary content includes advertisement content.

5. The information processing apparatus according to claim 1, wherein the switching type is a gap in playback during the switching, loss of quality during the switching, or seamless switching.

6. The information processing apparatus according to claim 1, wherein the manifest file update information includes update mechanism information, the update mechanism information indicating at least one update mechanism for the manifest file.

7. The information processing apparatus according to claim 6, wherein
the manifest file is a media presentation description (MPD), and
the update mechanism information includes a value of an event element of the MPD that is included in the period associated with the secondary content for which early termination is permitted.

8. The information processing apparatus according to claim 1, wherein
the manifest file update information includes one or a combination of minimum advanced notice timing information and minimum content duration information,
the request for the secondary content includes the one or the combination of the minimum advanced notice timing information and minimum content duration information, and
the secondary content is selected based on the one or the combination of the minimum advanced notice timing information and the minimum content duration information.

9. A method for processing a content stream, the method comprising:
receiving a manifest file for a content stream;
receiving primary content from a first server based on the manifest file;
receiving, by interface circuitry of an information processing apparatus, manifest file update information from the first server, the manifest file update information indicating early termination of secondary content of the content stream during a period is permitted;
sending a request for the secondary content associated with the period to a second server based on the manifest file update information;
receiving the secondary content from the second server; and
outputting, by circuitry of the information processing apparatus, the secondary content for display during the period based on whether the secondary content is terminated early,
wherein the manifest file includes early termination capability information that indicates a switching type in response to switching from the secondary content that is terminated early to the primary content.

10. The method according to claim 9, wherein the manifest file is a media presentation description (MPD).

11. The method according to claim 9, wherein the secondary content is presented between segments of the primary content.

12. The method according to claim 11, wherein the secondary content is advertisement content.

13. The method according to claim 9, wherein the switching type is a gap in playback during the switching, loss of quality during the switching, or seamless switching.

14. The method according to claim 9, wherein the manifest file update information includes update mechanism information, the update mechanism information indicating at least one update mechanism for the manifest file.

15. The method according to claim 14, wherein
the manifest file is a media presentation description (MPD), and
the update mechanism information includes a value of an event element of the MPD that is included in the period associated with the secondary content for which early termination is permitted.

16. The method according to claim 9, wherein
the manifest file update information includes one or a combination of minimum advanced notice timing information and minimum content duration information,
the request for the secondary content includes the one or the combination of the minimum advanced notice timing information and minimum content duration information, and
the secondary content is selected based on the one or the combination of the minimum advanced notice timing information and the minimum content duration information.

* * * * *